United States Patent
Van Dyn Hoven

(10) Patent No.: US 7,815,328 B2
(45) Date of Patent: *Oct. 19, 2010

(54) LIGHT

(75) Inventor: Victoria Jean Van Dyn Hoven, Stevens Point, WI (US)

(73) Assignee: Vicki Jean's Creations, Inc., Plover, WI (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/618,242

(22) Filed: Dec. 29, 2006

(65) Prior Publication Data

US 2007/0153527 A1    Jul. 5, 2007

Related U.S. Application Data

(60) Provisional application No. 60/755,605, filed on Dec. 30, 2005.

(51) Int. Cl.
*F21V 33/00* (2006.01)

(52) U.S. Cl. .................. 362/96; 362/256; 362/293; 362/311.03; 362/311.06; 362/311.13; 362/806

(58) Field of Classification Search .............. 362/237, 362/255–256, 293, 311, 652–654, 800, 96, 362/311.03, 311.06, 311.13, 806
See application file for complete search history.

(56) References Cited

U.S. PATENT DOCUMENTS

| | | | |
|---|---|---|---|
| 326,459 A | 9/1885 | Sprague | |
| 452,701 A | 5/1891 | Gartner et al. | |
| 727,495 A | 5/1903 | Todd | |
| 1,625,591 A | 4/1927 | Chase | |
| 1,632,850 A * | 6/1927 | Raymond | 362/255 |
| 2,134,356 A | 10/1938 | Clemence | |
| 2,217,877 A | 10/1940 | Petry | |
| 2,741,812 A | 4/1956 | Tellier | |
| 3,116,885 A | 1/1964 | Morse | |
| 3,188,513 A * | 6/1965 | Hansler | 313/112 |
| 3,312,814 A | 4/1967 | Reading | |
| 3,435,286 A * | 3/1969 | Kayatt | 315/47 |
| 3,763,347 A * | 10/1973 | Whitaker | 392/391 |
| 3,808,419 A | 4/1974 | McCarthy | |
| 4,591,959 A * | 5/1986 | Kenyon | 362/252 |
| 4,647,433 A | 3/1987 | Spector | |
| 5,143,443 A | 9/1992 | Madsen | |
| 5,221,140 A | 6/1993 | Oshino | |
| 5,359,506 A | 10/1994 | Koleno | |
| 5,599,092 A * | 2/1997 | Yen | 362/294 |
| 5,908,231 A | 6/1999 | Huff | |
| 5,918,966 A | 7/1999 | Arnold | |
| 5,918,967 A | 7/1999 | Land | |
| 5,951,148 A | 9/1999 | Limber | |
| 6,048,082 A | 4/2000 | Washimoto | |
| 6,086,225 A | 7/2000 | Kahl et al. | |
| 6,155,695 A | 12/2000 | Sealy | |
| 6,361,192 B1 | 3/2002 | Fussell et al. | |
| 6,398,386 B1 | 6/2002 | Huang | |
| 6,494,591 B1 | 12/2002 | Guimond | |
| 6,508,573 B1 | 1/2003 | Yamazaki | |

(Continued)

*Primary Examiner*—Jason Moon Han
(74) *Attorney, Agent, or Firm*—Rathe Patent & IP Law

(57) ABSTRACT

A decorative light and a method for making a decorative light having layers of distinct flexible materials on a bulb are disclosed.

23 Claims, 5 Drawing Sheets

U.S. PATENT DOCUMENTS

| | | |
|---|---|---|
| 6,733,155 B2 | 5/2004 | Lee et al. |
| 6,796,677 B1 | 9/2004 | Mohacsi |
| 6,827,469 B2 | 12/2004 | Coushaine et al. |
| 6,902,297 B1 | 6/2005 | Fung |
| 2006/0203498 A1* | 9/2006 | Lin .......................... 362/351 |

* cited by examiner

LIGHT

CROSS-REFERENCE TO RELATED PATENT APPLICATIONS

The present application claims priority under 35 USC §119 from U.S. provisional U.S. Patent Application Ser. No. 60/755,605 filed Dec. 30, 2005 by Victoria Jean Van Dyn Hoven and entitled LIGHT SURROUND AND MULTI-CHARACTERISTIC LIGHT COVERING, the full disclosure which is hereby incorporated by reference.

BACKGROUND

Decorative lights are frequently used to decorate during holidays or other occasions. Many decorative lights are limited to the shape of the bulb. Others have rigid translucent shells about the bulbs. Such shells lack desired light transmitting or tactile characteristics.

DETAILED DESCRIPTION OF THE EXAMPLE EMBODIMENTS

Figure 1:
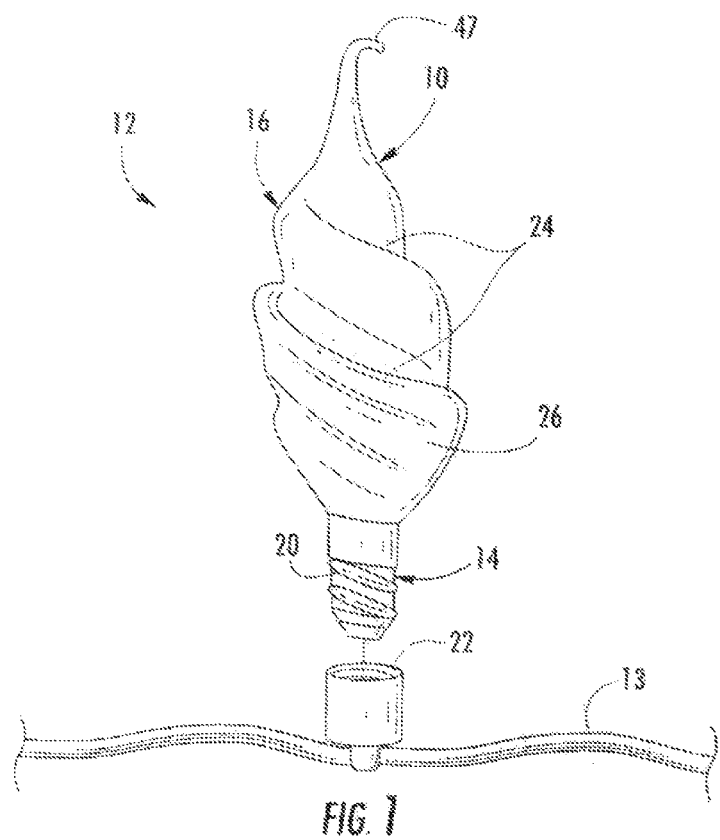
FIG. 1 is an exploded fragmentary perspective view of a light string including a decorative light according to an example embodiment.

FIGS. 1 and 3f illustrate decorative light 10 according to an example embodiment. FIG. 1 illustrates decorative light 10 provided as part of a light string 12. FIG. 1 illustrates decorative light 10 separated from electrical string or cord 13. FIG. 3f illustrates portion of decorative light 10 in section for purposes of illustration. As shown by FIGS. 1 and 3f, decorative light 10 includes light bulb 14 and soft or flexible and at least partially translucent outer coating 16. Bulb 14 includes a head portion 18 surrounding an origin of light, such as a filament 21 (shown in FIG. 4), and a connection portion 20 configured to be connected to an electrical power source. In one embodiment, bulb 14 comprises an incandescent light bulb. In other embodiments, bulb 14 may comprise other light emitting devices, such as one or more light emitting diodes. In the example embodiment illustrated, connection portion 20 is configured to be screwed into a socket 22 of electrical cord 13. In other embodiments, connection portion 20 may comprise other electrical connecting and transmitting structures.

Coating 16 comprises multiple layers of distinct soft flexible and translucent materials extending about or around head portion 18 of bulb 14. In the particular example embodiment illustrated, coating 16 includes a first layer 24 of a translucent silicone material and a second layer 26 of a second translucent silicone material. In one embodiment, layers 24 and 26 have distinct colors. According to one example embodiment, coding 16 has an underlying layer of a darker color and overlying or outer layer of a lighter color. As a result, more light is able to pass through a multilayer coating 16. In another embodiment, layers 2426 may additionally or alternatively have distinct scents.

As shown by FIG. 3f, an exterior surface of coating 16 has formed therein grooves, waves or channels 30 that encircle head portion 18. According to one example embodiment, coating 16 has a single channel 30 that spirals about that portion 18. In other embodiments, coating 16 may be provided with a greater number of individual channels 30. In lieu of spiraling or twisting about head portion 18, such channels may alternatively concentrically extend about head portion 18. In other embodiments, grooves 30 may be replaced with other depressions, such as dimples or craters.

In the particular example illustrated, channel 30 has a varying depth. In the example illustrated, channel 30 includes channel portions 32A, 32B and 32C. Channel portions 32A extends substantially through layers 24 and 26 into close proximity to that portion 18 of bulb 14. As a result, light emitted through floors of channel portions 32A is substantially the same color as the color of light emitted by bulb 14. For example, if bulb 14 is a white light, white light is transmitted though channel portions 32A. Channel portions 32B extend substantially through layer 26 by do not extend through layer 24. Channel portions 32B extend into close proximity with an exterior of layer 24. As a result, light passing through floors of channel portions 32B will have a color determined by or controlled by the color of light emitted by bulb 14 as modified by the color of layer 24. Channel portions 32C extend only partially into layer 26. As a result, light emitted through the floors of channel portions 32C will have a color determined by or controlled by the color of light emitted by bulb 14, as modified by the collar of layer 24 and is further modified by the color of layer 26. The extent to which channel portions 32C extend into layer 26 (how close the floors of such channel portion 32C extend to layer 24) may also be varied to vary the extent to which layer 26 modifies (by selectively absorbing selected wavelengths of light) the color emitted through such channel portion 32C. In yet other embodiments, channel 30 may have a uniform depth across and through layers 24 and 26 of coating 16. Although coating 16 is illustrated as two such layers, in other embodiments, coating 16 may have a greater number of layers with one or more of the layers having distinct colors and/or scents.

Figure 2A:
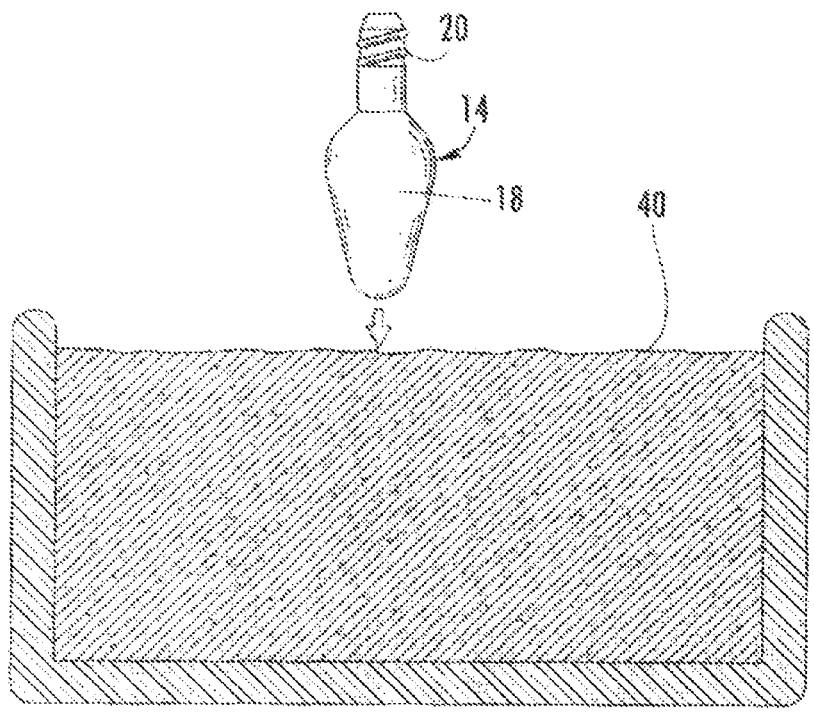
FIG. 2a-2f are fragmentary sectional views illustrating a method of forming the decorative light FIG. 1 according to an example embodiment.
Figure 2B:
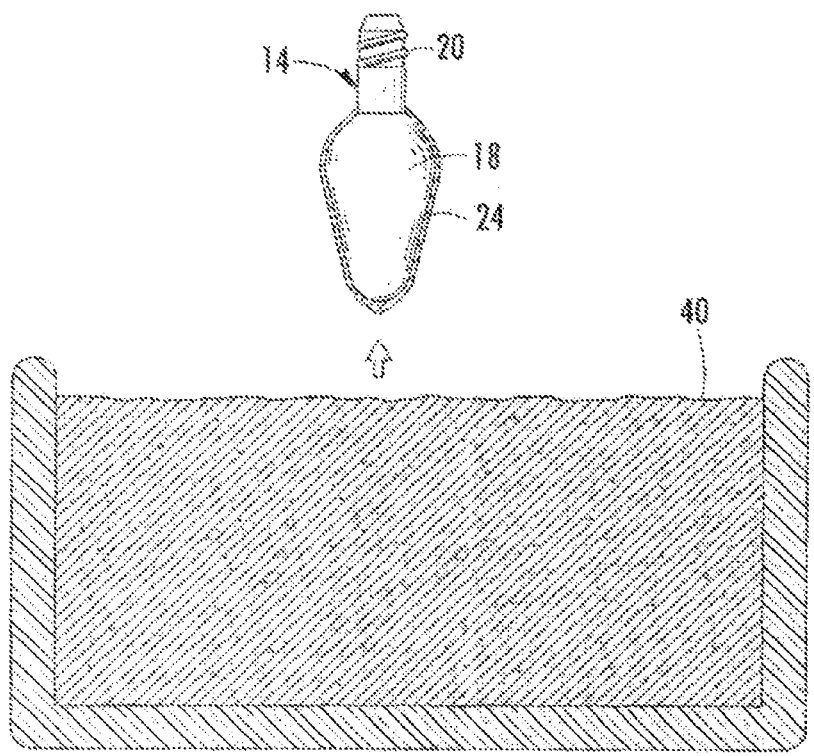

FIGS. 2a-2f illustrate one example method for forming decorative light 10. As shown by FIGS. 2a and 2b, bulb 14 is initially dipped into a liquid or fluid silicone material 40 and withdrawn to form layer 24 upon head portion 18. Connection portion 20 of bulb 14 is not dipped into silicone material 40. Thereafter, the silicone coating 24 is permitted to solidify or cure.

Figure 2C:
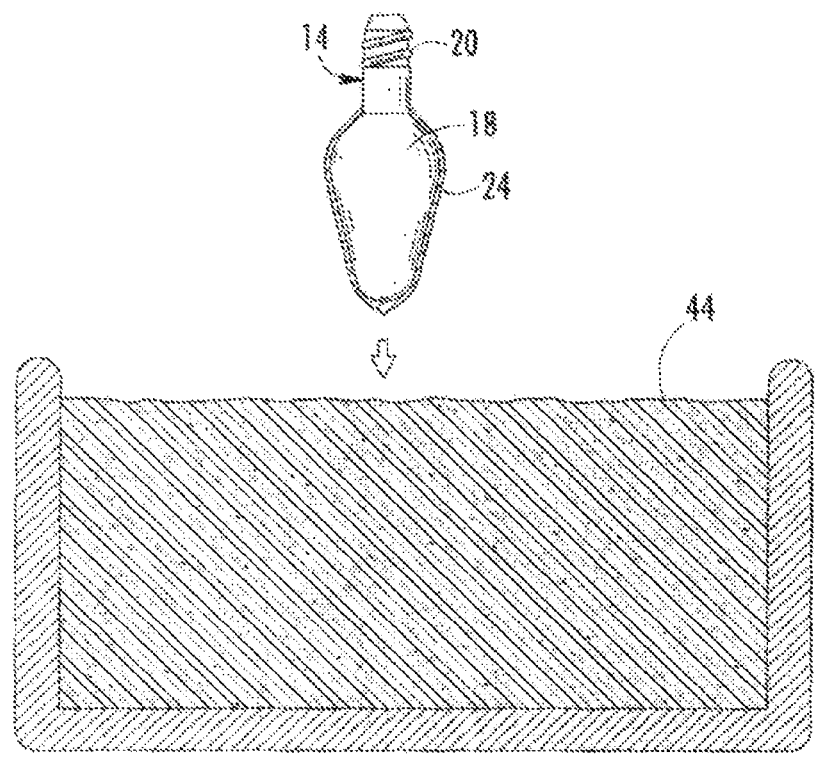
Figure 2D:
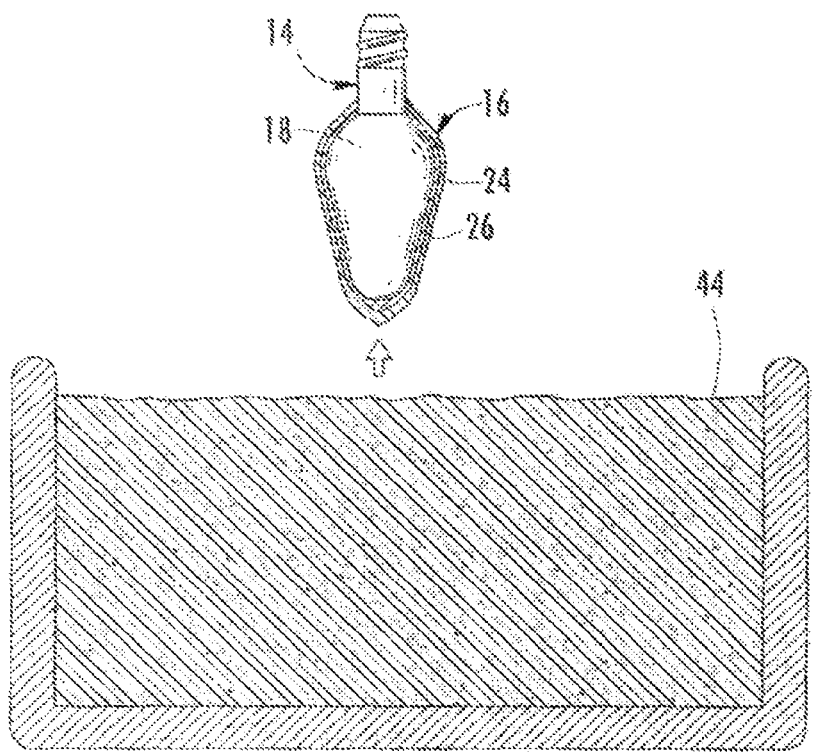

As shown FIGS. 2c and 2d, bulb 14 with layer 24 is dipped into a liquid or fluid silicone material 44 and withdrawn. Silicone material 44 is distinct from silicone material 40. In one embodiment, material 44 has a distinct color or pigment as compared to silicone material 40. In another embodiment, silicone material 44 additionally or alternatively has a distinct scent as compared to silicone material 40. As shown by FIG. 2d, the withdrawn bulb 40 has two layers 24 and 26 which form coating 16. Although not shown in FIGS. 2a-2f, bulb 14 is withdrawn from the silicone material 44 so as to form an elongate substantially pointed tail 47 as shown FIG. 1. This tail 47 permits decorative light 10 to imitate or resemble a lit flame of a candle. In other embodiments, this tail may be omitted.

Although layers 24 and 26 are illustrated as being formed upon head portion 18 of bulb 14 by dipping bulb 14 into silicone materials 40 and 44, in other embodiments, layers 24 and 26 may be formed upon head portion 18 in other manners. For example, layers 24 and 26 may alternatively be sprayed, brushed, laminated or otherwise coated or applied to bulb 14.

Figure 2E:
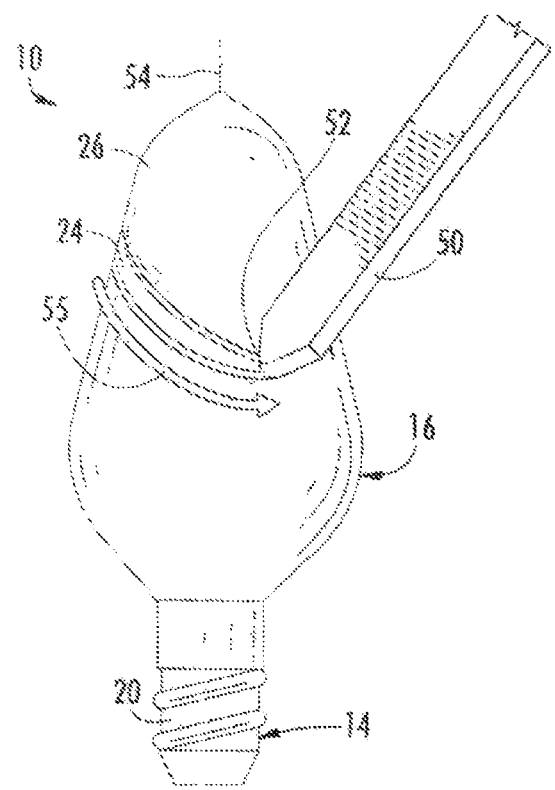
Figure 2F:
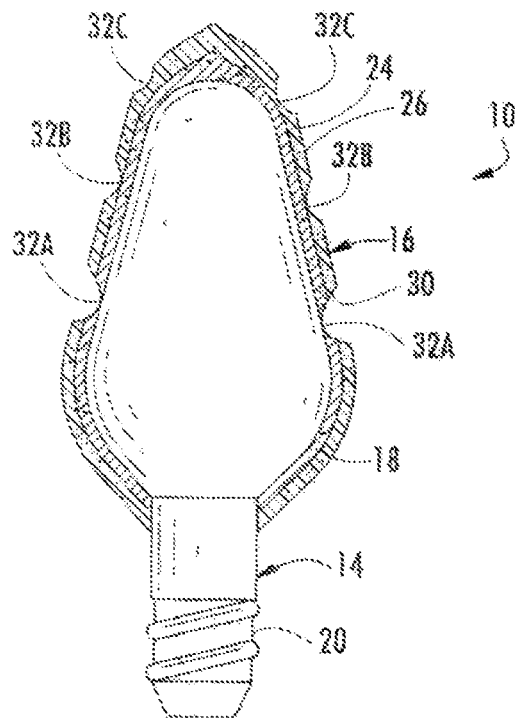

As shown by FIG. 2e, groove 30 is formed by selectively removing portions of coating 16. In one embodiment, portions of layer 26 are removed prior to the silicone material of layer 26 solidifying or curing. Such portions of layer 26 are removed to expose layer 24 or lessen the thickness of layer 26. In the example illustrated, one or both of bulb 14 or a removal tool 50 having a removal edge 52 are rotated relative to one another while edge 52 is in contact and partially extending into layer 26 so as to form groove 30 extending about head portion 18. In the example embodiment illustrated, one or both of bulb 14 and removal tool 50 are further moved relative to one another along an axis 54 during such rotation such that groove 30 spirals or twists about axis 54 and about head portion 18 of bulb 14 in the direction indicated by arrow 55.

In those embodiments in which channel 30 penetrates at least partially into layer 24, other removal techniques may be employed to remove the already cured or solidified portions of layer 24. For example, a relatively sharp knife or blade may be used to remove portions of layer 26 as well as the cured or solidified portions of layer 24. In yet other embodiments, layer 26 may be formed upon layer 24 prior to complete curing or solidification of layer 24. In such an embodiment, portions of layer 24 may also be removed prior to complete curing or solidification of layer 24, easing the amount of force or the aggressiveness of the removal technique for removing selected portions of layer 24. In still other embodiments, only portions of layer 26 may be removed to form channel 30. After groove 30 is informed, layer 26 is permitted to solidify or to cure.

Figure 3:
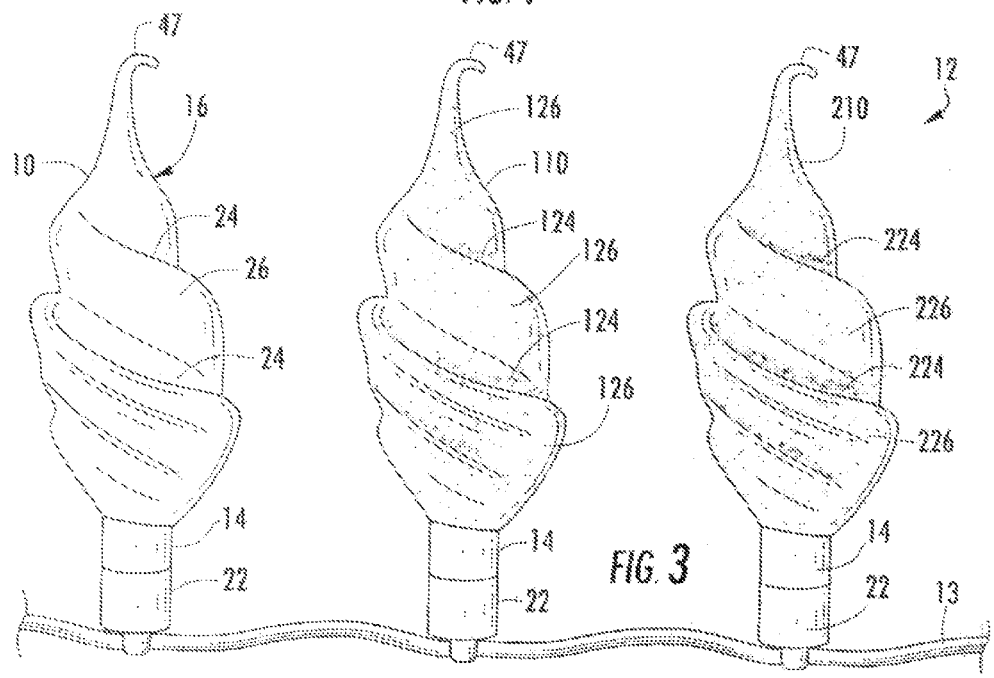
FIG. 3 is a fragmentary perspective view of a larger portion of the light string of FIG. 1 according to an example embodiment.

FIG. 3 illustrates a larger portion of light string 12 (shown also in FIG. 1). FIG. 3 illustrates decorative light 10 connected to electrical cord 13. FIG. 3 further illustrates decorative lights 110 and 210 also connected to electrical cord 13 to form light string 12. In the particular example illustrated, light 10 has a first silicone layer 24 provided with a red pigment or tone and a second silicone layer 26 formed from a silicone material having a white pigment or tone. At the same time, bulb 14 is configured to emit light having a reddish or orange color or pigment, rather than white light. As a result, those portions of layer 24 which have a higher degree of exposure remain red such that the resulting light passing through grooves 30, which expose portions of layer 24, has a red color rather than a pink color. Consequently, colors of light passing through coating 16 remain distinct from one another, resulting in light 10 providing red and white stripes. By selectively emitting a non-white light with bulb 14 chosen based upon the particular color combinations of coating 16, three of more distinct colors of light may be provided or the distinctiveness or two or more colors of light emitted from light 10 may be maintained.

Light 110 and 210 are similar to light 10 expect that lights 110 and 210 have distinct combinations of silicone. According to one embodiment, light 110 has an underlying layer 124 provide with an orange pigment or color and an overlying layer 126 provided with a black pigment or color. Light 210 is similar to light 10 expect that light 210 alternatively include a first layer 224 which is provided with a while pigment or color in a first sent while layer 226 is provided with a red color or pigment and a second distinct scent. In other embodiments, light string 12 may have other decorative light having other combinations of colors and/or scents. In one embodiment, light string 12 may be provided with all of one type of decorative light, each light having the same combination of colors and/or scents. In another embodiment different record of lights having different combinations of colors and/or scents may be combined as shown in FIG. 3. Other examples of color combination include (the first color being the underlying color): violet/white, dark purple/white, royal blue/white, light blue/white, Sage/white, tan/white, cinnamon brown/white, green/brown and green/orange.

Figure 4:
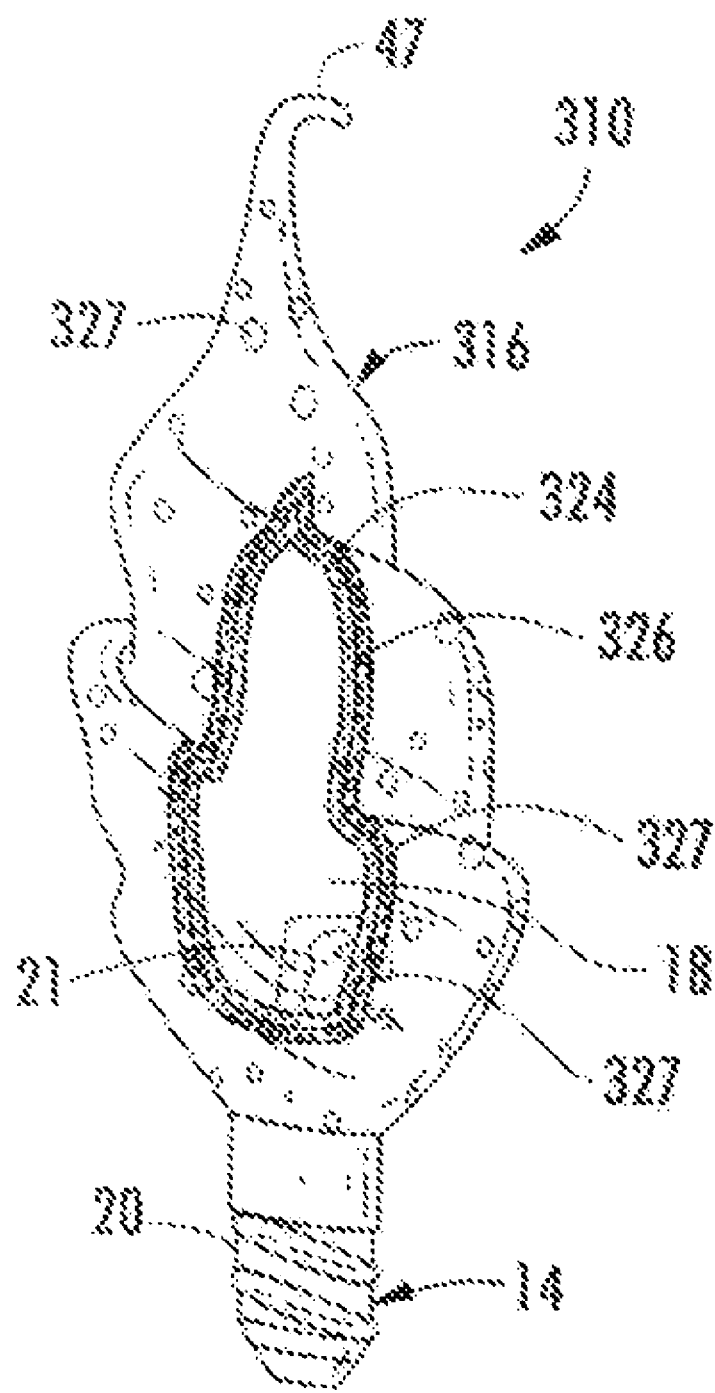
FIG. 4 is a perspective view of another embodiment of the decorative light of FIG. 1 with portions shown in section for purposes of illustration according to an example embodiment.

FIG. 4 illustrates decorative light 310, another embodiment of the decorative light 10. Portions of light 310 are shown in section for purpose of illustration. Decorative light 310 is similar to decorative light 10 except that decorative light 310 includes coating 316 having layers 324 and 326 in lieu of layers 24 and 26, respectively. Those remaining elements of light 310 which correspond to elements of light 10 are numbered similarly.

Layers 324 and 326 similar to layers 24 and 26 accept that layers 324 and 326 additionally include embedded particulates, granules, crystals, flakes, bubbles or embedded objects and the like (collectively referred to as embeds 327, which are schematically illustrated) dispersed throughout layers 324 and 326. In one embodiment, layer 324 may have a first embed dispersed throughout while layer 326 has a second embed dispersed throughout. In other embodiments, layer 324 and 326 may have the same embeds dispersed throughout. Examples of embeds include dried flowers, coffee grains, seeds, glitter, hazelnut coffee grains or crystals commercially available under the brand FOLGERS. In one embodiment, materials 22 comprise poppy seeds. In yet other embodiments, embeds 327 may comprise a whole, ground or cut materials such as seeds, spices, or ground plant or flower parts. In other embodiments, and then throughout 327 may comprise granules or flakes visible through material of layer or 324 or layer 326. In other embodiments, embeds 327 may comprise phosphors, which upon being excited, such as upon receiving ultraviolet light or radiation from bulb 14 (wherein bulb 14 is configured to emit radiation, such as alter file at light), emit visible light. Embeds 327 are generally provided by mixing such embeds 327 in one or more materials of layer 324 or 326 while the one or more materials of layer 324 or 326 are in a fluid state. For example, in embodiments where layer 324 is formed from silicone, embeds into 327 are mixed and distributed throughout the silicone or prior to the silicone being cured and while the silicone is in a fluid state. Upon curing or solidifying, the flexible material of body 20 fixes particulate material 22 throughout the matrix of material provided by the material of layer 324.

Embeds 327 including embedded objects comprise miniature objects having shapes corresponding to full-sized objects and formed from plastic, wood, metal or other materials. In one embodiment such embedded may have shapes corresponding to holidays such as hearts, stars, shamrocks, crosses, eggs, pumpkins, witches and the like. And one embodiment, embeds number 327 comprising objects may be colored or may have multiple colors associated with a particular holiday or event. In one embodiment, embed objects 327 may comprise one or more alphanumeric symbols or words.

Embeds 327 including bubbles comprise pockets or cavities of air or other gas dispersed or distributed throughout the material layer 324 or layer 326. Such embeds 327 may visually alter light or other electromagnetic radiation being transmitted through a material of layers 324 or layer 326 or being reflected or emanating from the other embeds 327. In particular embodiments, embeds comprising bubbles may be uniformly distributed throughout body layer 324 or layer 326. In other embodiments, such bubble embeds may be non-uniformly distributed within the layers. According to one embodiment, bubble embeds are formed by injecting air or other gas into the material of layer 324 or layer 326 prior to the material of layer 324 or layer 326 solidifying, curing or hardening. In particular embodiments, bubble embeds may alternatively be formed by the addition of a gassing agent to the one or more materials of layer 324 or layer 326.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a first decorative light comprising:
    a bulb;
    a first layer of a first flexible translucent material over at least a portion of the bulb; and
    a second layer of a second flexible translucent material distinct from the first flexible material and over at least a portion of the first layer,
wherein the first layer has a first aromatic scent and wherein the second layer has a second distinct aromatic scent.

2. The apparatus of claim 1, wherein the bulb is an incandescent bulb.

3. The apparatus of claim 1, wherein the first layer and the second layer have distinct colors.

4. The apparatus of claim 3, wherein the second material is more translucent than the first material.

5. The apparatus of claim 3, wherein the second layer has a non-uniform thickness over the first layer.

6. The apparatus of claim 3, wherein the second layer includes at least one channel.

7. The apparatus of claim 6, wherein the first layer is visible through the the at least one channel.

8. The apparatus of claim 6, wherein the at least one channel encircles the bulb.

9. The apparatus of claim 6, wherein the at least one channel spirals about the bulb.

10. The apparatus of claim 1, wherein the bulb is configured to emit a colored light, wherein the first layer has a color and wherein the bulb is configured to emit the color.

11. The apparatus of claim 1, wherein the first layer has a first color and wherein the second layer has a second distinct color.

12. The apparatus of claim 1 further comprising:
    a second decorative light comprising:
    a second bulb;
    a third layer of a third flexible translucent material over at least a portion of the second bulb; and
    a fourth layer of a fourth flexible translucent material distinct from the third flexible material and over at least a portion of the third layer; and
    a string supporting and supplying electrical power to the first light and the second light.

13. The apparatus of claim 12, wherein the first material, the second material, the third material and the fourth material comprise silicone and wherein at least one of the first material and the second material has a different scent then at least one of the third material and the fourth material.

14. The apparatus of claim 1 further comprising embeds dispersed throughout at least one of the first layer or the second layer.

15. The apparatus of claim 14, wherein the embeds are completely surrounded on all sides by at least one of the first layer or the second layer.

16. The apparatus of claim 1 further comprising a channel extending through the first layer and the second layer, wherein the bulb forms a floor surface of the channel.

17. The apparatus of claim 1 further comprising a channel extending through the second layer and partially into the first layer, wherein the first layer forms a floor surface of the channel and wherein the first layer and the second layer form interior side surfaces of the channel.

18. The apparatus of claim 17, wherein the channel spirals or encircles the bulb.

19. The apparatus of claim 1, wherein the second layer has a pointed tail on an end of the bulb projecting longitudinally beyond a longitudinal length of the bulb.

20. The apparatus of claim 19, wherein the tail has a centerline and is sufficiently flexible so as to bend about the centerline.

21. The apparatus of claim 1 further comprising embeds dispersed throughout at least one of the first layer or the second layer, the embeds selected from a group of embeds consisting of: dried flowers, coffee grains, coffee crystals, seeds, glitter, spices or ground plant or flower parts.

22. The apparatus of claim 1 further comprising embeds dispersed throughout at least one of the first layer or the second layer, the embeds being selected from a group of embeds consisting of: particulates, granules, crystals, flakes or miniature objects having shapes corresponding to full-size objects.

23. The apparatus of claim 1, wherein the first layer and the second layer are both formed substantially from silicone but have different scents.

* * * * *